United States Patent
Smith

(10) Patent No.: US 12,552,292 B1
(45) Date of Patent: Feb. 17, 2026

(54) MOTOR VEHICLE SEAT MOUNTING SYSTEM

(71) Applicant: Lance Smith, Southaven, MS (US)

(72) Inventor: Lance Smith, Southaven, MS (US)

(*) Notice: Subject to any disclaimer, the term of this patent is extended or adjusted under 35 U.S.C. 154(b) by 181 days.

(21) Appl. No.: 18/422,657

(22) Filed: Jan. 25, 2024

(51) Int. Cl.
*B60N 2/005* (2006.01)

(52) U.S. Cl.
CPC .................................. *B60N 2/005* (2013.01)

(58) Field of Classification Search
CPC ................................ B60N 2/005; B60N 2/015
See application file for complete search history.

(56) References Cited

U.S. PATENT DOCUMENTS

| | | | |
|---|---|---|---|
| 4,718,719 | A | 1/1988 | Brennan |
| 5,947,562 | A | 9/1999 | Christofferson et al. |
| 10,051,930 | B2 | 8/2018 | Heim |
| 11,110,831 | B2 | 9/2021 | Coffman |
| 2003/0168897 | A1 | 9/2003 | Braun et al. |
| 2017/0233030 | A1* | 8/2017 | Smith .................. B62K 21/14 74/551.2 |
| 2020/0269734 | A1* | 8/2020 | Coffman ............ B60N 2/42709 |
| 2021/0162902 | A1* | 6/2021 | Hong .................... B60N 2/015 |
| 2022/0161689 | A1* | 5/2022 | Yanaka ................. B60N 2/015 |
| 2023/0150588 | A1 | 5/2023 | Deckard et al. |
| 2023/0173957 | A1 | 6/2023 | Parker |

FOREIGN PATENT DOCUMENTS

DE 102019123070 A1 3/2021

OTHER PUBLICATIONS

"Racetech RTB2005C Seat Back Brace Clamps", Racetech, Retrieved from the Internet URL: https://competitionmotorsport.com/products/racetech-rtb2005c-seat-back-brace-clamps?variant=43205436768475, Date Nov. 2, 2023.
"Kirkey Specific Roll Bar / Roll Cage Seat Brace 1-1/4 tube—NHRA Legal!", Scram Speed, Retrieved from the Internet URL: https://www.ceramspeed.com/products/kirkey-specific-roll-bar-roll-cage-seat-brace-1-1-4-tube-nhra-legal.html, Date Nov. 1, 2023.
"Empi race trim performance offroad racing rear bench suspension seat mount", Kustom1warehouse, Retrieved from the Internet URL: https:/www.kustom1warehouse.net/Rhino_and_Razor_bench_seat_mounts_p/page344-2011.html, Date Nov. 1, 2023.

* cited by examiner

Primary Examiner — Rodney A Bonnette
(74) Attorney, Agent, or Firm — C. Brandon Browning; Maynard Nexsen PC

(57) ABSTRACT

A seat mounting system including a first horizontal bar coupled to a bottom of a seat and a second horizontal bar coupled to a back of the seat, the first and second bars being secured within an automobile chassis. The seat is coupled to each of the first and second bars by two mounting assemblies, each assembly including an elastomeric sleeve disposed about a bar, a first bracket portion attached to the seat and a second bracket portion attached to the first bracket portion and arranged to compress the sleeve between the bar and the first and second bracket portions. A pinch clamp assembly is attached to the bar immediately adjacent to the mounting assembly for preventing sliding of the assembly along the bar, the pinch clamp assembly including a bushing disposed on the bar and pressed against the mounting assembly by a pinch clamp bracket fixed to the bar.

16 Claims, 8 Drawing Sheets

MOTOR VEHICLE SEAT MOUNTING SYSTEM

FIELD OF INVENTION

The present invention is directed to a motor vehicle seat mounting system, and more particularly, to a system for dampening the transmission of vibrations and impact forces from a motor vehicle chassis through a motor vehicle seat to an occupant of a motor vehicle arising from operation of the motor vehicle over uneven surfaces.

BACKGROUND OF INVENTION

Vehicle seats rigidly mounted to the chasses of motor vehicles allow impacts experienced when driving the motor vehicles to be transferred directly to the vehicles' seats and occupants. Impacts can be created by depressions or holes in a roadway or transitions between uneven surfaces. When motor vehicles are driven at high speeds, such as motor vehicles driven in auto races, the magnitude of impacts and resulting forces can injure occupants. A common injury suffered by auto racers is caused by vertical impact forces transferred to the spinal column of the racers. Accordingly, there is a need for a vehicle seat mounting system that reduces the transmission of impact forces from vehicle chasses to vehicle occupants.

SUMMARY OF THE INVENTION

The present invention is directed to a vehicle seat mounting system that reduces the transmission of impact forces from vehicle chasses to occupants. The system includes four bracket assemblies, each bracket assembly comprised of a polymer sleeve configured to fit snuggly around a cylindrical bar, a first bracket portion configured for attaching to a seat and receiving the sleeve, a second bracket portion configured for attaching to the first bracket portion and receiving and compressing the sleeve between the bar and the first and second bracket portions. The system further includes four to eight pinch clamp assemblies, each pinch clamp assembly including a polyurethane disc configured to encircle the bar and a first pinch clamp bracket comprised of two halves configured for being rigidly fixed around the bar and compressing the disc against a medial side, a lateral side or both the medial side and the lateral side of a bracket assembly.

In use, a first pair of the bracket assemblies is coupled in a spaced-apart arrangement to and between the bottom of the seat and a first bar extending left to right across a floor of the motor vehicle. A pinch clamp assembly is secured to the first bar on the medial side of each of the first pair of brackets such that the disc is compressed between the pinch clamp and the bracket assembly. A second pair of the bracket assemblies is coupled in a spaced-apart arrangement to and between the back of the seat and a second bar extending left to right across the motor vehicle. A pinch clamp assembly is secured to the second bar on the medial side of each of the second pair of brackets such that the disc is compressed between the pinch clamp and the bracket assembly. Alternatively, a pinch clamp assembly is positioned on each side of a bracket assembly such that the bracket assembly is compressed between the two pinch clamp assemblies.

According to another embodiment of the invention, there is provided a motor vehicle seat mounting system including a plurality of mounting assemblies, each mounting assembly of the plurality of mounting assemblies having an elastomeric sleeve configured for being disposed about a mounting bar of a motor vehicle seat mounting bar assembly, a first bracket portion configured for receiving the elastomeric sleeve and being coupled to a motor vehicle seat, and a second bracket portion configured for receiving the elastomeric sleeve and being coupled to the first bracket portion. The first and second bracket portions are configured for compressing the elastomeric sleeve between the first bracket portion and the second bracket portion without directly contacting the mounting bar.

According to one aspect of the invention, each mounting assembly of the plurality of mounting assemblies may include a disk-shaped elastomeric member configured for being disposed about the mounting bar immediately adjacent to the first and second bracket portions. The elastomeric member may be a polyurethane elastomeric member, and each mounting assembly may include a clamp assembly configured for being disposed about the mounting bar and pressing the elastomeric member against the first and second bracket portions.

According to another aspect of the invention, the first bracket portion may include a flange configured for receiving fasteners for attaching the first bracket portion to the motor vehicle seat and a first passageway, and the second bracket portion may include a second passageway, the first and second passageways being configured for receiving a fastener for coupling the first bracket portion to the second bracket portion.

According to another embodiment of the present invention, there is provided a motor vehicle seat mounting system including a motor vehicle seat, a first bar coupled to a motor vehicle chassis and at least one first mounting assembly. The first mounting assembly may include a first bracket portion coupled to the motor vehicle seat, a second bracket portion coupled to the first bracket portion, and a first flexible sleeve disposed about the first mounting bar and compressed between the first and second brackets portions without the first and second bracket portions directly contacting the first bar. The first bracket portion may be coupled to a seat bottom of the motor vehicle seat or a seat back of the motor vehicle seat. A polyurethane bushing is disposed about the first bar immediately adjacent to the first and second bracket portions, and a first bar clamp is attached to the first bar and arranged to press the bushing against the first and second bracket portions.

According to one aspect of the invention, the first bracket portion may include a flange through which at least one fastener extends for attaching the first bracket portion to the motor vehicle seat. According to another aspect of the invention, a fastener may extend through a first passageway in the first bracket portion and a second passageway in the second bracket portion for coupling the first bracket portion to the second bracket portion.

According to yet another embodiment of the present invention, there is provided a method of making a motor vehicle seat mounting system, the method including providing a motor vehicle seat, a bar coupled to a motor vehicle chassis and a motor vehicle mounting assembly including a first bracket portion, a second bracket portion, and an elastomeric sleeve. A first elastomer sleeve and a second elastomer sleeve are disposed about the bar adjacent to one another, each of which includes a flange extending radially away from the bar. The second bracket portion is then coupled to the first bracket portion with the first elastomeric sleeve, the second elastic sleeve and the bar located between the first and second bracket portions whereby the first and second elastomer sleeves are compressed between the first and second bracket portions without the first and second bracket portions contacting the bar with the first flange located adjacent to a first side of the second bracket portion and the second flange portion located adjacent to a second side of the second bracket portion. The first flange is compressed between the first side of the second bracket portion and a first bar clamp rigidly coupled to the bar, and the second flange is compressed between the second side of the second bracket and a second bar clamp rigidly coupled to the bar.

BRIEF DESCRIPTION OF THE DRAWINGS

The following detailed description of the present invention may be better understood, by way of example only, with reference to the following drawings. The elements of the drawings are not necessarily to scale relative to each other, emphasis being placed upon clearly illustrating the principles of the disclosure. Furthermore, like reference numerals designate corresponding features in several views or insets.

DETAILED DESCRIPTION OF THE INVENTION

Figure 1:
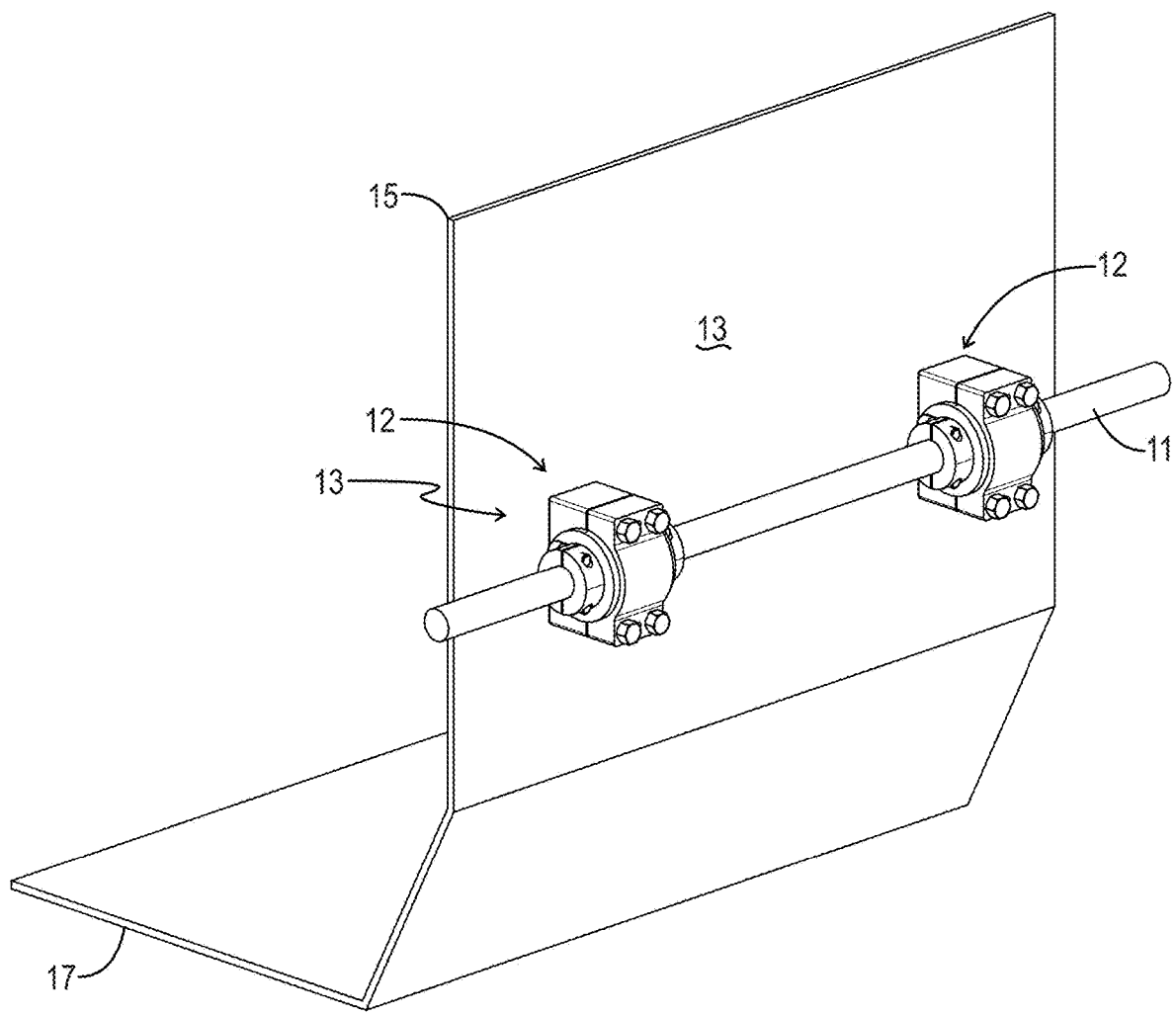
FIG. 1 is a perspective view of a back of motor vehicle seat operatively coupled to a seat back mounting bar of a motor vehicle using a first embodiment of a motor vehicle seat mounting system in accordance with the present invention.
Figure 2:
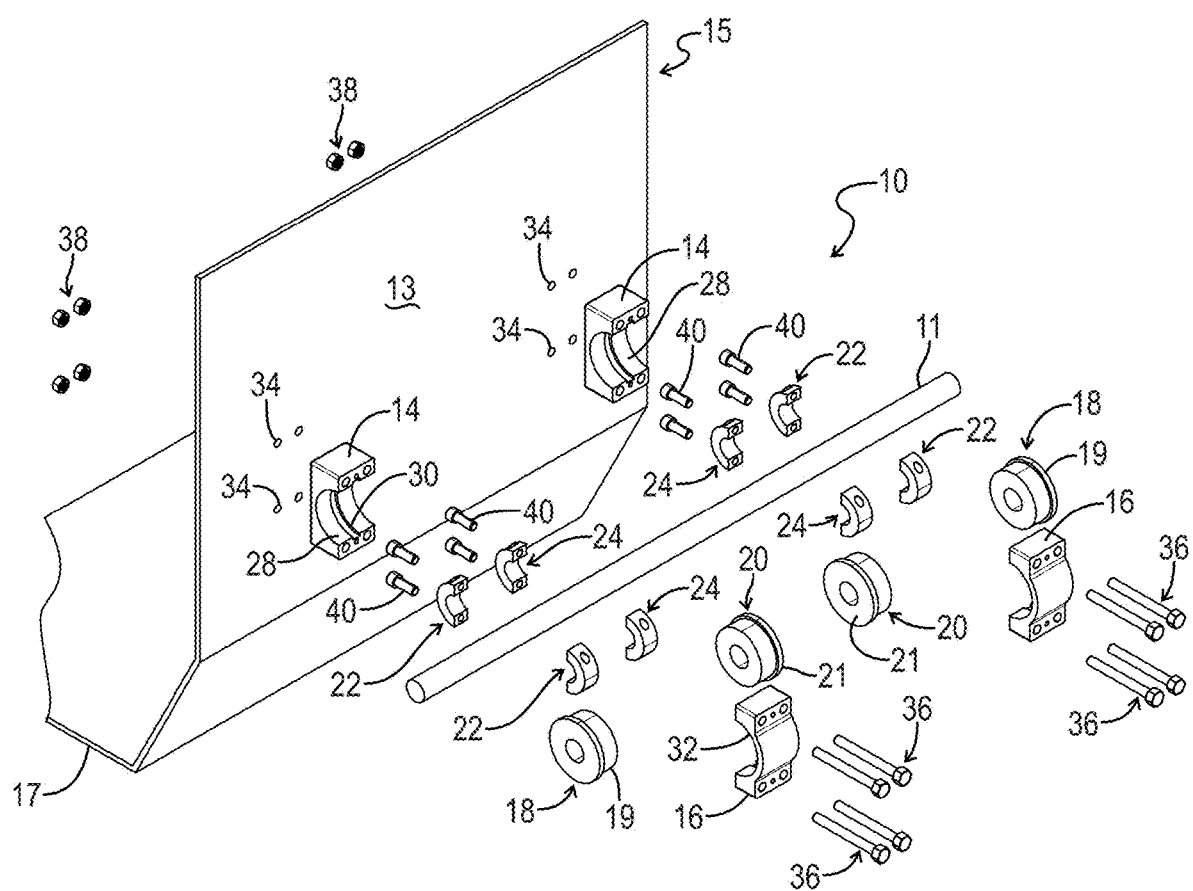
FIG. 2 is an exploded view of the motor vehicle seat mounting system of FIG. 1.
Figure 3:
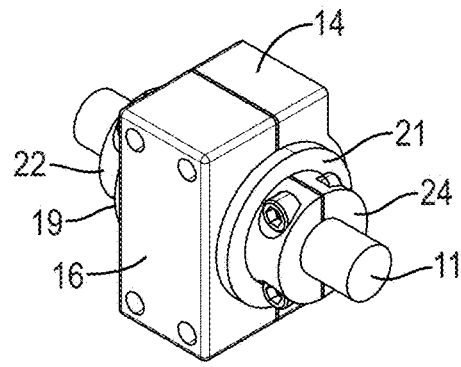
FIG. 3 is a perspective view of a mounting assembly of the motor vehicle seat mounting system of FIG. 1.
Figure 4:
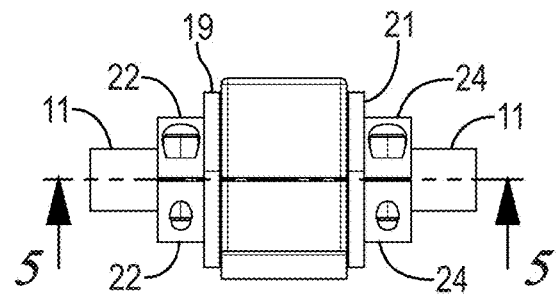
FIG. 4 is an elevational view of the mounting assembly of FIG. 3.
Figure 5:
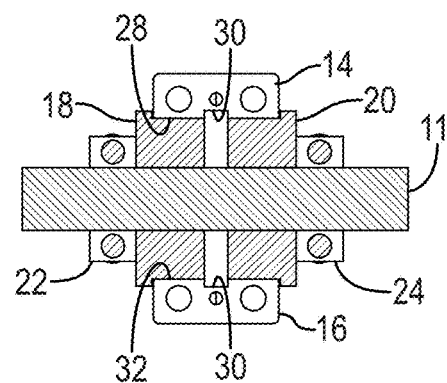
FIG. 5 is a sectional view of the mounting assembly of FIG. 4 along line 5-5.
Figure 6:
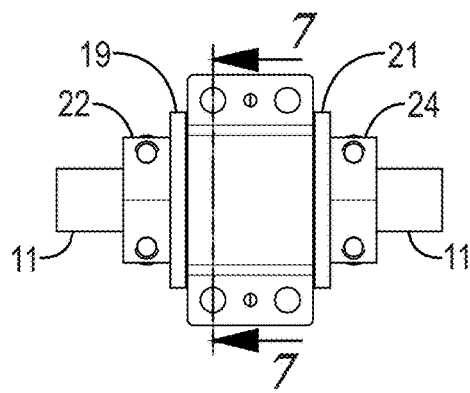
FIG. 6 is a top view of the mounting assembly of FIG. 3.
Figure 7:
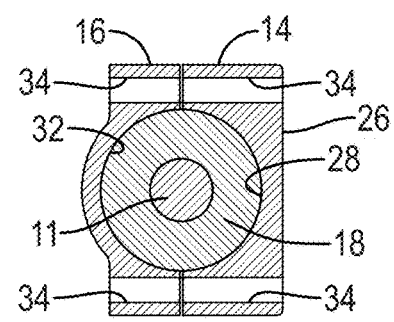
FIG. 7 is a sectional view of the mounting assembly of FIG. 6 along line 7-7.
Figure 8:
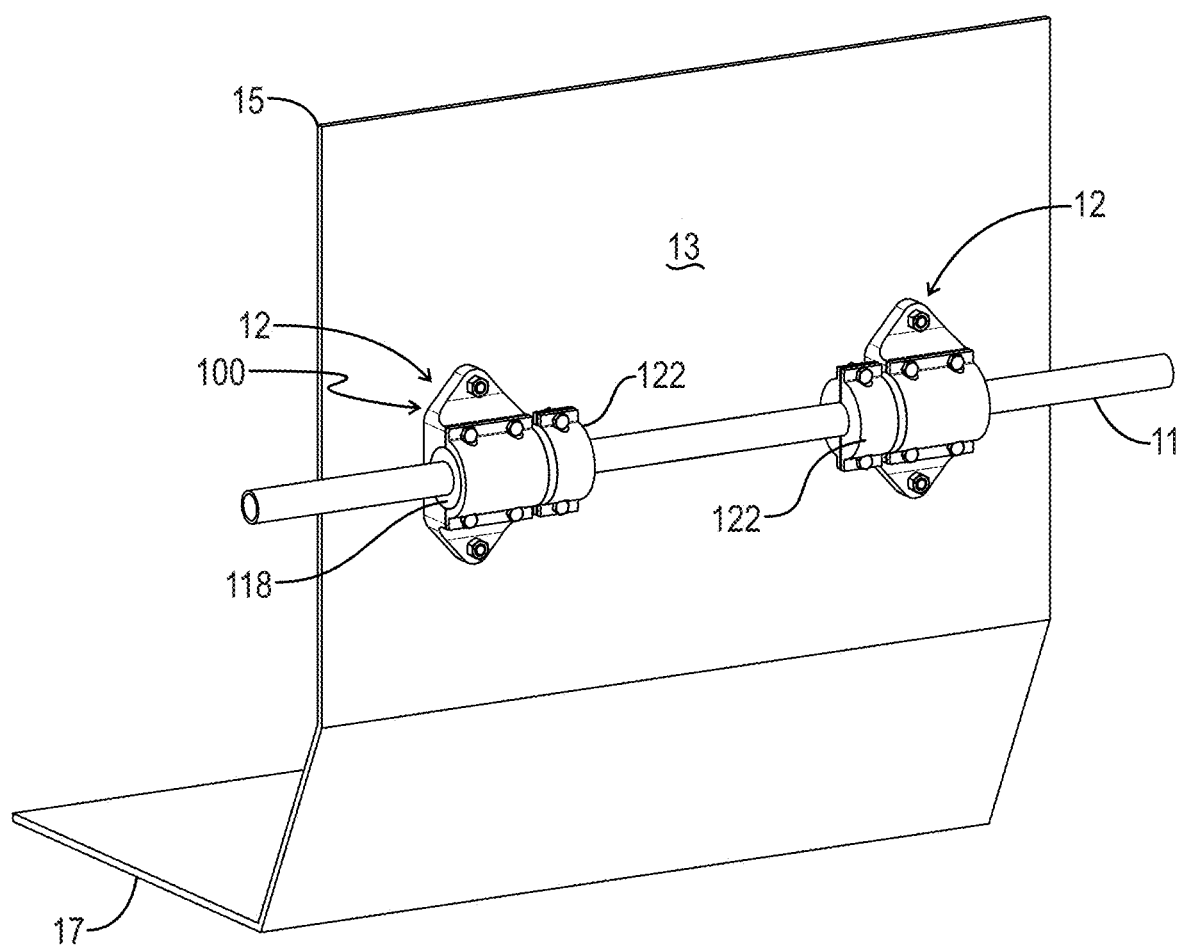
FIG. 8 is a perspective view of a back of motor vehicle seat operatively coupled to a seat back mounting bar of a motor vehicle using a second embodiment of a motor vehicle seat mounting system in accordance with the present invention.
Figure 9:
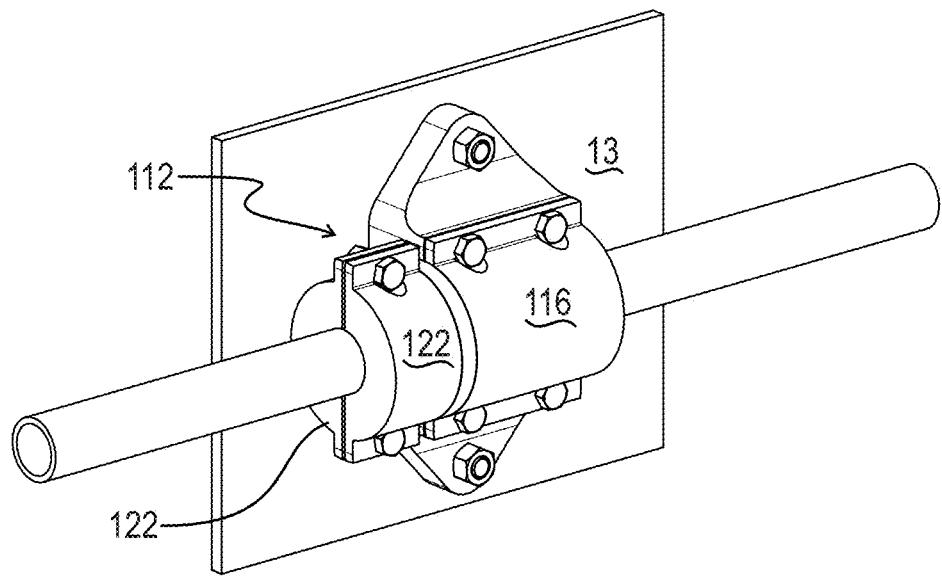
FIG. 9 is a perspective view of medial side of a mounting assembly of the motor vehicle seat mounting system of FIG. 8.
Figure 10:
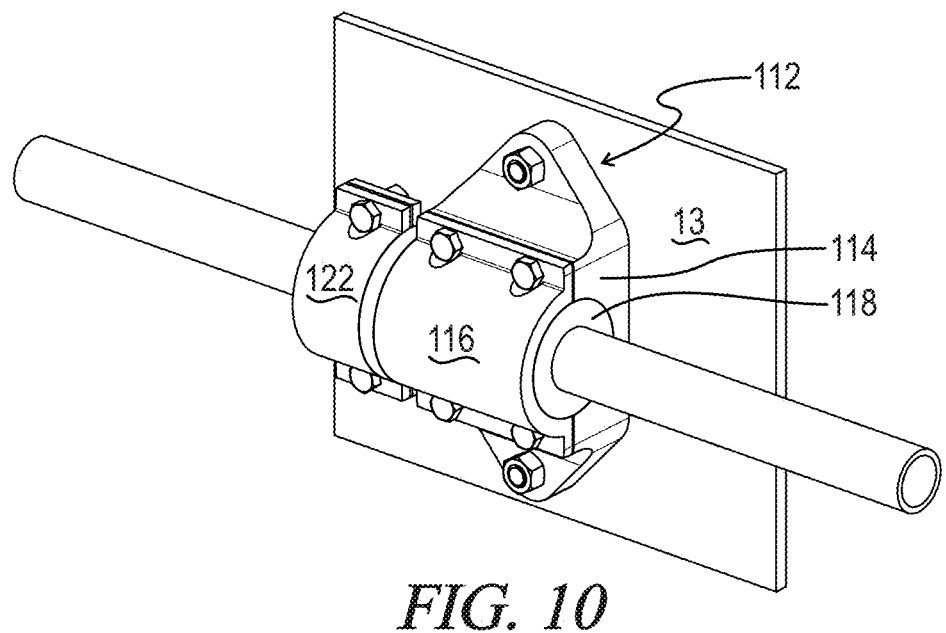
FIG. 10 is a perspective view of lateral side of the mounting assembly of FIG. 9.
Figure 11:
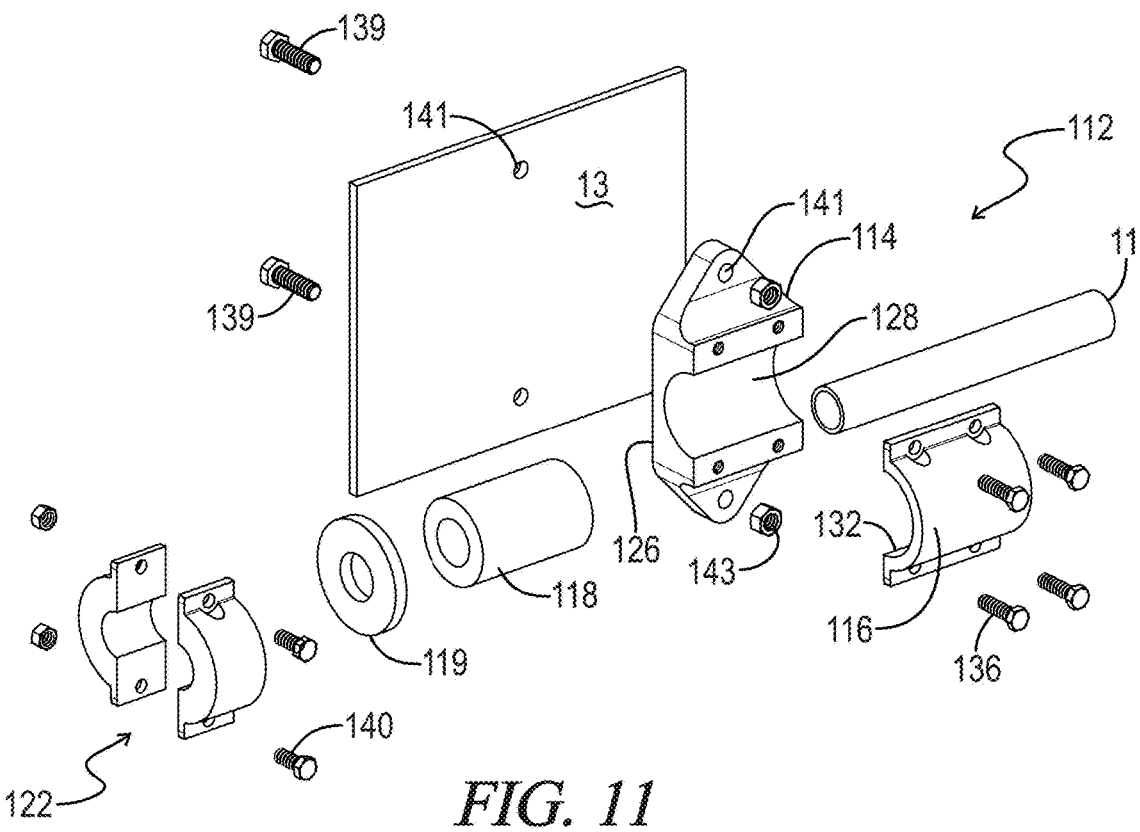
FIG. 11 is an exploded view of the mounting assembly of FIG. 9.
Figure 12:
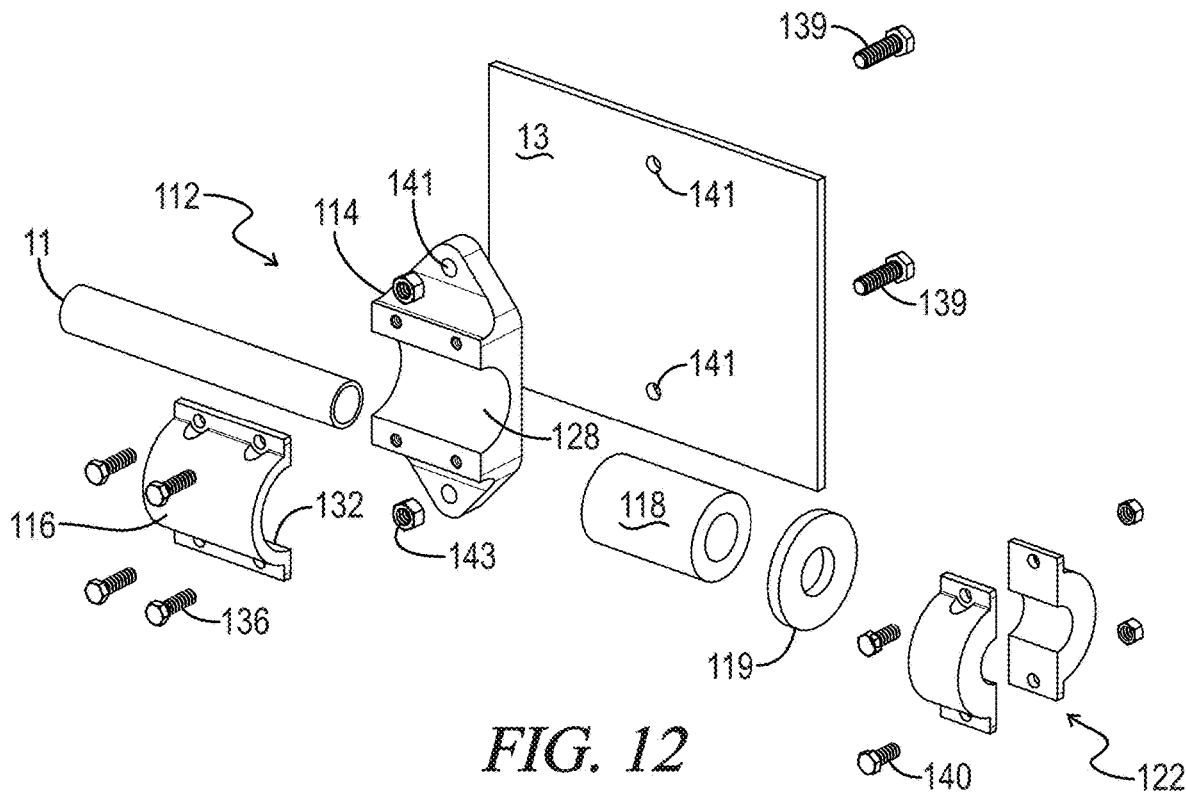
FIG. 12 is an exploded view of the mounting assembly of FIG. 10.
Figure 13:
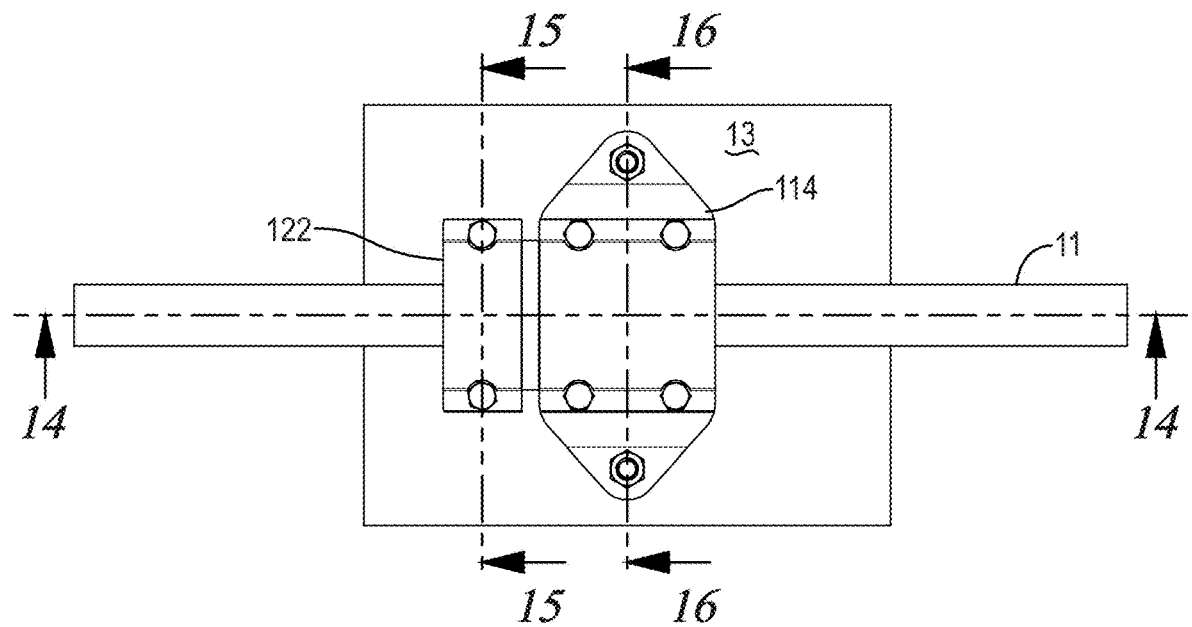
FIG. 13 is an elevational view of the mounting assembly of FIG. 9.
Figure 14:
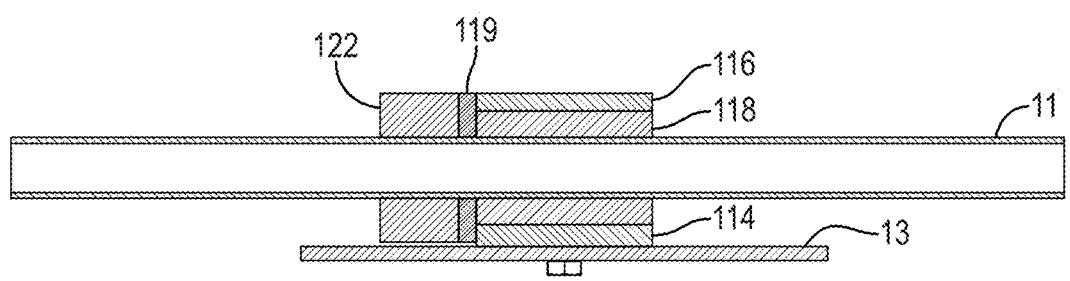
FIG. 14 is a sectional view of the mounting assembly of FIG. 13 along line 14-14.
Figure 15:
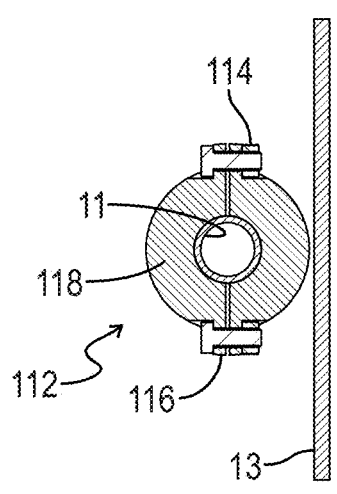
FIG. 15 is a sectional view of the mounting system of assembly FIG. 13 along line 15-15.

The present invention is directed to a system for dampening the transmission of vibrations and force from a motor vehicle chassis through a motor vehicle seat to an occupant of a motor vehicle. FIGS. 1 through 7 illustrate a motor vehicle seat mounting system 10 in accordance with a first embodiment of the present invention. FIGS. 8 through 15 illustrate a motor vehicle seat mounting system 100 in accordance with a second embodiment of the present invention, where like portions share like numbering with FIGS. 1 through 7. Generally, systems 10 and 100 each include a first pair of mounting assemblies coupled to and between a horizontal first bar 11 and a back side 13 of a motor vehicle seat 15 and a second pair of mounting assemblies, which are essentially identical in structure to the first pair of mounting assemblies, coupled to and between a horizontal second bar (not shown) and a bottom side 17 of seat 15. First bar 11 and the second bar are rigidly attached to or may form a part of a motor vehicle chassis, and therefore, impact forces generated during operation of the motor vehicle are transmitted directly to the first and second bars. Systems 10 and 100 are intended to isolate seat 15 from such impact forces. Before the present articles, devices, and/or methods are disclosed and described in detail, it is to be understood that they are not limited to specific methods unless otherwise specified, and as such may vary. It is also to be understood that the terminology as used herein is used only for the purpose of describing particular embodiments and is not intended to be limiting.

More particularly, referring to FIGS. 1 through 8, system 10 includes a pair of mounting assemblies 12 attached to bar 11 and back side 13 of seat 15 in a spaced apart arrangement. Each mounting assembly 12 is comprised of a first bracket 14 configured for being rigidly coupled to back side 13, a second bracket 16 configured for being rigidly coupled to first bracket 14, and a pair of polymer sleeves comprised of a lateral sleeve 18 with a lateral flange portion 19 and a medial sleeve 20 with a medial flange portion 21, each of sleeves 18, 20 being configured for circumscribing bar 11 and being received and compressed within and between first and second brackets 14, 16 with lateral and medial flange portions 19, 21 located adjacent to lateral and a medial sides, respectively, of first and second brackets 14, 16 without being compressed there between. Each of mounting assemblies 12 further includes a pair of clamp assemblies comprised of a lateral clamp assembly 22 configured for rigid attachment to bar 11 on a lateral side of each of first and second brackets 14, 16 and a medial clamp assembly 24 configured for rigid attachment to bar 11 on a medial side of each of first and second brackets 14, 16. Compressed between each lateral clamp assembly 22 and the lateral sides of first and second brackets 14, 16 is lateral flange portion 19, and compressed between each medial clamp assembly 24 and the medial sides of first and second brackets 14, 16 is medial flange portion 21. Clamp assemblies 22, 24 in combination with lateral and medial flange portions, 19, 21 function to prevent or inhibit slippage of seat 15 and assemblies 12 horizontally along bar 11, for example, that would otherwise result from horizontal forces exerted on the seat when the motor vehicle traversers curves at high speeds. System 10 isolates seat 15 from vertical impact forces imparted to bar 11 since (i) lateral and medial sleeves 18, 20 are positioned between bar 11 and first and second brackets 16, 18, (ii) lateral and medial flange portions 19, 21 are positioned between lateral and medial clamp assemblies 24, 24 and first and second brackets 14, 16, (iii) direct or rigid contact is avoided between bar 11, on the one hand, and seat 15 and first and second brackets 16, 18, on the other hand, and (iv) direct contact is avoided between lateral and medial clamp assemblies 24, 24, on the one hand, and seat 15 and first and second brackets 14, 16, on the other hand.

Each of lateral and medial sleeves 18, 20 forms a cylinder and is fabricated from an elastomeric polymer. Suitable polymers from which sleeves 18, 20 can be fabricated include asphaltics, polyurethanes, poly (vinyl acetate) and copolymers, acrylics, natural rubber and styrene-butadiene rubber and silicone rubber. The hardness of sleeves 18, 20 may vary depending on the desired stiffness of the coupling of bar 11 to seat 15, the weight of occupants, and the applications for which they are intended, for example, whether the sleeves are for use with sports cars, touring cars, production cars, stock cars, rally cars or dragsters. Extending radially outward from one end of each of lateral and medial sleeves 18, 20 is an integrally-formed flange portion including lateral flange portion 19 extending from one end of lateral sleeve 18 and medial flange portion 21 extending from one of medial sleeve 20. Sleeves 18, 20 are configured for wrapping directly around bar 11 which may be accomplished by providing a split in each of the sleeves or sliding the sleeves onto bar 11 prior to bar 11 being installed in a motor vehicle chassis. In either instance, a set of lateral and medial sleeves 18, 20 are arranged on bar 11 for each assembly 12 with their ends that are opposite to lateral and medial flange portions 19, 21 oriented immediately adjacent to one another.

First and second brackets 14, 16 are metal brackets fabricated from steel, titanium, or aluminum. First bracket 14 includes first face 26 that is configured for directly engaging and coupling to back side 13 of seat 15 and a second face 28 opposite to first face 26. Second face 28 exhibits a semi-circular cross-section and is configured for receiving lateral and medial sleeves 18, 20. Second bracket 16 includes an inner face 32 having semi-circular cross-section and is configured for receiving lateral and medial sleeves 18, 20. Each of second face 28 and inner face 32 include a channel 30. Channel 30 has a width that defines a distance separating lateral and medial sleeves 18, 20 when the sleeves are received within first and second brackets 14, 16.

With two sets of lateral and medial sleeves 18, 20 arranged on bar 11, each pair of bracket assemblies is assembled by positioning first and second brackets 14, 16 on opposing sides of bar 11 with lateral sleeve 18 aligned with second face 28 of first bracket 14 and inner face 32 of second bracket 16 on a lateral side of channel 30 and medial sleeve 20 aligned with second face 28 of first bracket 14 and inner face 32 of second bracket 16 on a medial side of channel 30. First and second brackets are then pressed together thereby compressing lateral and medial sleeves 18, 20 between first and second brackets 14, 16 with lateral and medial flange portions 19, 21 extending immediately adjacent to the lateral and medial sides, respectively, of first and second brackets 14, 16. First and second brackets 14, 16 are coupled together by passing fasteners or bolts 36 through aligned bolt holes 34 that extend through the lateral and medial edges of first and second brackets 14, 16 and seat 15. Bolts 36 are secured to seat with nuts 38.

To prevent horizontal movement of first and second brackets 14, 16, lateral and medial sleeves 18, 20 and seat 15 along bar 11, clamp assemblies including lateral and medial clamp assemblies 22, 24 are pressed against lateral flange portion 19 and medial flange portion 21, respectively, and rigidly attached to bar 11. No portion of the clamp assemblies contacts seat 15 or first and second brackets 14, 16. Each of lateral and medial clamp assemblies 22, 24 includes a pair of semicircular bracket members configured to receive and bear against rod 17 by inserting fasteners or screws 40 through aligned screw holes in the bracket members and rotating the screws thereby pulling each semicircular bracket member of a pair of semicircular bracket members together around bar 11. Lateral and medial clamp assemblies 22, 24 pinch bar 11 and therefore resist horizontal movement along bar 11, while pressing against lateral and medial flange portions 19, 21, respectively. In this way, horizontal movement of seat 15, sleeves 18, 20 and first and second brackets 14, 16 along bar 11 is prevented.

Figure 16:
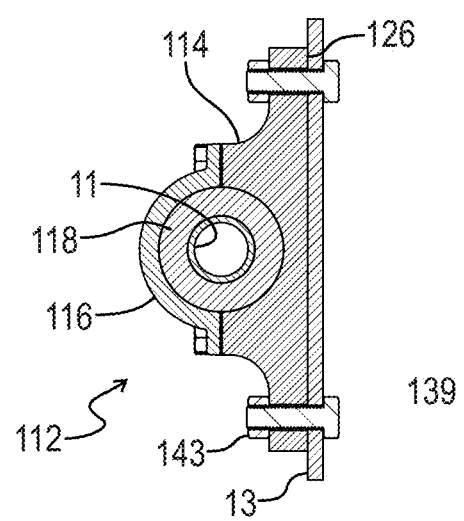
FIG. 16 is a sectional view of the mounting system of assembly FIG. 13 along line 16-16.

Referring to FIGS. 8 through 16, system 100 includes a pair of mounting assemblies 112 attached to bar 11 and back side 13 of seat 15 in a spaced apart arrangement. Each mounting assembly 112 is comprised of a first bracket 114, a second bracket 116, and a polymer sleeve 118. Each of mounting assemblies 112 further includes a clamp assembly 122 configured for rigid attachment to bar 11. Compressed between clamp assembly 122 one side of first and second brackets 114, 116 is a bushing 119. Clamp assembly 122 in combination with bushing 119 functions to prevent slippage of seat 15 and assemblies 112 horizontally along bar 11. System 100 acts to isolate seat 15 from vertical impact forces imparted to bar 11.

Each sleeve 118 forms a cylinder and is fabricated from an elastomeric polymer. The hardness of sleeves 118 may vary depending on the desired stiffness of the coupling of bar 11 to seat 15, the weight of occupants, and the applications for which sleeves are intended. Sleeves 118 are configured for wrapping directly around bar 11 which may be accomplished by providing a split in the sleeves or sliding the sleeves onto bar 11 prior to bar 11 being installed in a motor vehicle chassis. Sleeves 118 are arranged spaced apart on bar 11.

First bracket 114 includes first face 126 that is configured for directly engaging and coupling to back side 13 of seat 15 and a second face 128 opposite to first face 126. Second face 128 exhibits a semi-circular cross-section and is configured for receiving sleeve 118. Second bracket 116 includes an inner face 132 having semi-circular cross-section and is configured for receiving sleeve 118. With sleeves 118 arranged on bar 11, the bracket assemblies are assembled by positioning first and second brackets 114, 116 on opposing sides of bar 11 with a sleeve 18 aligned with second face 128 of first bracket 114 and inner face 132 of second bracket 116. First and second brackets 114, 116 are then pressed together thereby compressing sleeve 18 there between. First and second brackets 114, 116 are coupled together by passing bolts 136 through bolt holes 34 that extend through first and second brackets 114, 116. First bracket 114 is then coupled to seat 15 by passing bolts 139 through bolts holes 141 extending through seat 15 and first bracket 114, which are secured using nuts 143.

To prevent horizontal movement of first and second brackets 114, 116, sleeves 18 and seat 15 along bar 11, a bushing 119 is placed on bar 11 on either the lateral side or the medial side of each of assemblies 112. A clamp assembly 122 is then pressed against each bushing 119 and rigidly attached to bar 11. As depicted in FIGS. 8 through 14, bushing 119 is placed on the medial side of each first and second brackets 114, 116 with no portion of the clamp assemblies 112 contacting seat 15 or first and second brackets 114, 116. Each clamp assembly includes a pair of semicircular bracket members configured to receive and bear against rod 11 by inserting screws 140 through aligned screw holes in the bracket members, engaging screws 140 with nuts and rotating the screws thereby pulling each semicircular bracket member of a pair of semicircular bracket members together around bar 11. Clamp assembly 122 pinches bar 11 and therefore resists horizontal movement along bar 11, while pressing against bushings 119.

As will be apparent to one skilled in the art, various modifications can be made within the scope of the aforesaid description. For example, while assemblies 12 and 112 are depicted being coupled between a seat back and a bar, it is anticipated that assemblies 12 and 112 may be coupled between a seat bottom and another oriental bar. It is further contemplated that assemblies 12 may be used to attach a seat back of a seat to a motor vehicle chassis, while assemblies 112 are used to attach a seat bottom of the seat to the chassis, or vice-versa. Such modifications being within the ability of one skilled in the art form a part of the present invention and are embraced by the claims below.

I claim:

1. A motor vehicle seat mounting system comprising:
a plurality of mounting assemblies, each mounting assembly of the plurality of mounting assemblies including,
an elastomeric sleeve configured for being disposed about a mounting bar of a motor vehicle seat mounting bar assembly,
a first bracket portion configured for receiving the elastomeric sleeve and being coupled to a motor vehicle seat, and
a second bracket portion configured for receiving the elastomeric sleeve and being coupled to the first bracket portion,
wherein the first and second bracket portions are configured for compressing the elastomeric sleeve between the first bracket portion and the second bracket portion without directly contacting the mounting bar,
wherein each mounting assembly of the plurality of mounting assemblies includes an elastomeric member configured for being disposed about the mounting bar immediately adjacent to the first and second bracket portions, and
wherein the elastomeric member and the elastomeric sleeve are integrally formed.

2. The system of claim 1, wherein each mounting assembly of the plurality of mounting assemblies includes a clamp assembly configured for being disposed about the mounting bar and pressing the elastomeric member against the first and second bracket portions.

3. The system of claim 1, wherein the first bracket portion includes a flange configured for receiving fasteners for attaching the first bracket portion to the motor vehicle seat.

4. The system of claim 1, wherein the first bracket portion includes a first passageway and the second bracket portion includes a second passageway, the first and second passageways being configured for receiving a fastener for coupling the first bracket portion to the second bracket portion.

5. The system of claim 1, wherein the elastomeric member is a disk-shaped, polyurethane member.

6. A motor vehicle seat mounting system comprising:
a motor vehicle seat,
a first bar coupled to a motor vehicle chassis,
at least one first mounting assembly including,
a first bracket portion coupled to the motor vehicle seat,
a second bracket portion coupled to the first bracket portion, and
a first flexible sleeve including an integrally formed first flange member at an end thereof, the first flexible sleeve being disposed about the first mounting bar and compressed between the first and second brackets portions without the first and second bracket portions directly contacting the first bar and with the integrally formed first flange member located adjacent to a first side of the first bracket portion.

7. The system of claim 6, wherein the first bracket portion is coupled to a seat bottom of the motor vehicle seat.

8. The system of claim 6, wherein the first bracket portion is coupled to a seat back of the motor vehicle seat.

9. The system of claim 6, including a second flexible sleeve including an integrally formed second flange member at an end thereof, the second flexible sleeve being disposed about the first mounting bar and compressed between the first and second brackets portions with the integrally formed second flange member sleeve located adjacent to a second side of the first bracket portion that is opposite the first side.

10. The system of claim 9, including a second bar clamp attached to the first bar and arranged to press the integrally formed second flange against the second side of the first bracket portion.

11. The system of claim 9, wherein the first flexible sleeve and the second flexible sleeve are integrally formed.

12. The system of claim 9, wherein the first flexible sleeve is spaced apart from the second flexible sleeve.

13. The system of claim 6, including a first bar clamp attached to the first bar and arranged to press the integrally formed first flange against the first side of the first bracket portion.

14. A method of making a motor vehicle seat mounting system comprising:
providing a motor vehicle seat, a bar coupled to a motor vehicle chassis and a motor vehicle mounting assembly including a first bracket portion, a second bracket portion, and an elastomeric sleeve,
disposing a first elastomer sleeve about the bar,
attaching the first bracket portion to the motor vehicle seat,
coupling the second bracket portion to the first bracket portion with the first elastomeric sleeve and the bar located between the first and second bracket portions whereby the first elastomer sleeve is compressed between the first and second bracket portions without the first and second bracket portions contacting the bar,
disposing a disk-shaped member on the bar immediately adjacent to the first and second bracket portions, and
disposing a second elastomer sleeve about the bar with the second elastomeric sleeve and the bar located between the first and second bracket portions whereby the second elastomer sleeve is compressed between the first and second bracket portions without the first and second bracket portions contacting the bar,
wherein the first elastomer sleeve includes a first flange portion extending radially away from the bar and located adjacent to a first side of the second bracket portion and the second elastomer sleeve includes a second flange portion extending radially away from the bar and located adjacent to a second side of the second bracket portion.

15. The method of claim 14, including attaching a bar clamp to the bar whereby the disk-shaped member is pressed against the first and second bracket portions.

16. The method of claim 14, wherein the first flange is compressed between the first side of the second bracket portion and a first bar clamp rigidly coupled to the bar and the second flange is compressed between the second side of the second bracket and a second bar clamp rigidly coupled to the bar.

* * * * *